3,140,186
PECTIN COMPOSITION
William A. Bender, Bloomfield, N.J., and Domenic De Felice, Harrison, and Nicholas D. Pintauro, New City, N.Y., assignors to General Foods Corporation, White Plains, N.Y., a corporation of Delaware
No Drawing. Filed May 2, 1962, Ser. No. 192,007
10 Claims. (Cl. 99—132)

This invention relates to jelly-forming compositions which contain pectin and more specifically to a pectin-containing product which is characterized by superior properties.

As is well known to those skilled-in-the-art, pectin may be prepared from e.g. apple pomace or citrus peel by a process wherein undesirable solubles may be first removed by a water leaching treatment. The moist, leached material may then be treated with acid at elevated temperature, the time and pH of the treatment being interdependent. During the acid treatment, pectin is solubilized. The inert fibrous material may be separated from the aqueous pectin extract and pectin is recovered in dry form by precipitation.

The pectin so-produced may find ready use in the formation of jellies by combining with various fruit and fruit juices. More specifically, the pectin may be sold in the form of a mixture of more-or-less standard weight containing 3–4 grams of pectin together with a substantial additional amount of a dispersant or filler, usually a carbohydrate such as glucose or dextrose, in amount e.g. 22–26 grams, but more typically 62–66 grams. It will be apparent that the amount of pectin will be dependent on the grade, i.e. the jelling ability, and commonly the jelling ability is expressed as grade-grams. Typically such a mixture contains 923 grade-grams per package. This mixture commonly contains an acid in amount sufficient to permit attainment in the jelly product of the desired pH. Citric acid is commonly employed in amount of about 5–7 grams, and this will commonly give a product pH of 2.7–3.6.

Although compositions such as the above are commonly employed, they are characterized by numerous defects and deficiencies which render them much less than wholly satisfactory. The prime defect of the pectin-citric acid system is its short storage life. If the best pectin-citric acid composition be subjected to ordinary storage conditions under the warmer and more humid conditions, it will be found that the composition loses its jelling ability or jelly value after the first summer; i.e. if it be prepared in one spring, it is usable during the summer immediately following but not during the second summer. Thus it has a storage life of only one fruit season.

Furthermore, it is found that the more-or-less standard pectin-citric acid-dextrose composition has a comparatively high moisture pick-up which results in a lumping of the material in the package with a resulting lower rate of solubility, which increases the chances of preparation of inferior jelly products.

Another defect of the best product heretofore available has been its non-uniformity and lack of homogeneity (i.e. segregation of the components of the mixture during the fill into the package), with the result that various packages (and even different portions of the same package) which had apparently been uniformly mixed, were found to be non-uniform with respect to composition.

Still another defect of the pectin-citric acid-dextrose compositions is their inability to remain free-flowing on storage. They quickly cake to give a non-free flowing product which is unsatisfactory to handle.

It is also an undesirable feature of these prior art pectin-citric acid-dextrose mixtures that the citric acid content generates a considerable proportion of the raw material cost with the result that the ultimate product is quite expensive.

It is found that the above defects of pectin-citric acid-dextrose combinations are due mainly to demethoxylation of the pectin as well as depolymerizing thereof. The results of these changes in the pectin give the inferior jelly products hereinbefore noted in detail.

It is an object of this invention to provide a pectinaceous gel-forming composition charactertized by an increased storage life, a low moisture pick-up during storage, a high degree of uniformity and homogeneity with respect to composition, a high degree of free-flowability, and a comparatively cost. Other objects will be apparent to those skilled-in-the-art on inspection of the following description.

In accordance with this invention, a gel-forming composition characterized by the above-mentioned desiderata may be prepared by mixing together pectin, a substantial excess of a dispersant, and fumaric acid.

Pectin, as the term is used herein, includes slow and rapid set pectins, i.e. pectins having a wide range of degrees of methylation. It is a particular feature that the advantages of this invention, particularly the stability, are apparent when the pectin is a methylated pectin (i.e. one having a D.M. of e.g. 72 to 75, say 73–74 D.M.), although other pectins including non-methylated or low methoxy pectins may be employed. The pectin may be ammonium pectinate or sodium pectinate and it is a particular feature of this invention that in practice of the invention, no browning reaction occurs, no grade loss occurs, and no undesirable color change occurs as is the case with the unsatisfactory prior art combinations including ammonium pectinate and citric acid.

The pectin which is employed in jelly-forming compositions of the instant invention must have a fine particle size of 100% through 80-mesh and about 60% maximum through 140-mesh. The term "mesh" as used herein refers to screens having U.S. standard sieve measurements.

The dispersant which is employed in the compositions of the instant invention must have a fine particle size of about 95% through 40-mesh, 69% through 100-mesh, and 10% through 200-mesh.

The dispersant or filler which may be employed in connection with this invention serves several purposes. It provides a bulk to the product which makes it readily handleable, which it would not be otherwise. It also serves to keep separate the various ingredients of the mixture, i.e. the pectin and the acid, thereby minimizing any undesirable effects prior to use. It also serves to provide a source of soluble solids and sweeteners in the final jelly thereby decreasing the amount of this material which must be added in the ultimate fabrication of the jelly.

Preferably the dispersant may be a soluble sugar; and typically it may be dextrose although sucrose or lactose can be employed. Commonly the dispersant, dextrose, will be present in amount of 22–65 grams, commonly 62–65 grams per 3–4 grams of pectin. A preferred mixture may contain 3 grams of pectin and 65 grams of dextrose. The dextrose may be anhydrous, but preferably it will be hydrated (e.g. to 8.8% water—one molecule of water of crystallization).

The amount of fumaric acid which is to be employed in accordance with this invention will be dependent upon the pH desired in the finished jelly product. The amount of fumaric acid is determined by the type of pectin to be employed and the particular types of fruit to be incorporated into the jelly. In general, the amount of fumaric acid added will be sufficient to permit attainment of a final product having a pH in the range of 2.7 to 3.6 and preferably about 2.9–3.3.

It is a feature of this invention that the amount of fumaric acid which must be employed to obtain the desired pH will preferably be 40%–50%, but more commonly 60%, of the amount of citric acid which must be employed to attain the same pH. Under typical conditions wherein a composition contains 3 g. pectin and 65 g. dextrose, it may be possible to attain a product pH 3.0 by use of 3 g. of fumaric acid. On the average, it would require about 5 g. of citric acid to attain the same pH 3.0.

Accordingly, it has been observed that the same product pH which may be obtained by a given amount of citric acid can be obtained by use of only 60% as much fumaric acid. Since the absolute costs of fumaric and citric acids are nearly equal, this represents a substantial saving when fumaric acid is employed. In terms of ultimate pectin-dextrose-acid composition this also represents a substantial savings.

Heretofore in use of citric acid, it has been found necessary to use very coarse acid particles, commonly of the order of about 40% on 40-mesh. If finer particles of citric acid were employed, the stability of the product was totally unsatisfactory: moisture pick-up was high; caking was high; and flowability was low. Furthermore demethylation and depolymerization were excessive. On the other hand, if coarser citric acid particles were used, it was found that the product had a somewhat improved storage life but it was still less than fully satisfactory, especially so under warm-humid climatic conditions. Accordingly, the commonly employed products contain fine particles of pectin e.g. of 80-mesh size and coarse particles of citric acid e.g. 40% on 40-mesh, and thes products were very non-uniform and non-homogeneous even after the most thorough mixing.

It has now been found that by using fumaric acid of particle size approximately equal to (i.e. having about the same particle size distribution as) that of the pectin particles, i.e. about 100% through 40-mesh, 50% through 60-mesh and 20% through 100-mesh, it is possible to obtain a stable product having a high uniformity, an intimate mixture and a long storage life. The mixture is substantially 100% homogeneous with no segregation. The shelf life of such a product may be typically at least two and possibly three fruit seasons under even the most adverse and severe storage conditions.

It may be noted that the solubility of fumaric acid is lower and the rate of solution is less than that of other acids heretofore employed; however, the solubility of the pectin-dextrose-fumaric acid combination is entirely satisfactory.

It is a particular feature of this invention that because of the improved and superior resistance to moisture pick-up, the substantial decrease in the loss of grade or jelly value of the pectin, the substantial decrease in the amount of lumping of the composition, and the improved flowability of the product, it is possible to use only the minimum degree of protection during production or packaging of the product. More specifically, the product can be prepared in the plant under hot and humid conditions without any adverse effect; and relatively cheap packaging materials, i.e., those which have little or no moisture barriers, may be employed.

It has been found that a variation of more than about 5% from the particle size ranges of the various ingredients set forth herein produces a product which is unacceptable because of non-uniformity. Furthermore, pectins having coarser particle sizes than those set forth herein will not dissolve properly, whereas finer particle sizes will clump. Fumaric acid which is too coarse does not dissolve properly, whereas if it is too fine the storage shelf life of the jelly composition is reduced.

The product of this invention may be employed as a jelling agent for fruits, fruit juices, vegetable juices, or other liquids. The following examples illustrate the practice of this invention.

*Example I*

According to this example the following were dry mixed:

|   | G. |
|---|---|
| Pectin (D.M. 73), 100% thru 80-mesh; 60% thru 140-mesh | 3.4 |
| Fumaric acid, 100% thru 40-mesh; 20% thru 100-mesh | 3.0 |
| Dextrose (hydrate), 100% thru 40-mesh; 65% thru 100-mesh | 64.6 |

This mixture (71 g., i.e. 2.5 oz.) was dissolved in 5 cups of prepared, extracted Concord grape juice and brought to a boil with stirring. Then seven cups of sugar were added and the mixture boiled for one minute and poured into glasses. The jelly set to a firm gel on cooling which was rigid, readily unmoldable, and of excellent texture.

*Example II*

In accordance with another example of this invention illustrating formation of a concentrated pectin composition, the following dry mixture was prepared:

|   | G. |
|---|---|
| Methylated pectin (73 D.M.) | 3.4 |
| Fumaric acid | 3.0 |
| Dextrose | 21.95 |
|   | One ounce, 28.35 |

The particle size of each of the components is the same for Example I.

This dry product has the same improved qualities found with the dry product of Example I despite its highly concentrated pectin-acid composition.

When the one-ounce sample of Example II was used in the same manner as the 2.5 ounce sample of Example I, a good quality jelly was obtained.

Although this invention has been described with respect to certain specific embodiments, it will be apparent to those skilled-in-the-art that various modifications may be made thereto. This application is a continuation-in-part of Serial No. 807,018, filed April 17, 1959, now abandoned.

What is claimed is:

1. A jelly-forming composition characterized by increased storage life, low moisture pick-up during storage, a high degree of uniformity and homogeneity with respect to the content and distribution of ingredients and a high degree of free-flowability which comprises pectin having a particle size of 100% through 80-mesh and about 60% maximum through 140-mesh, fumaric acid having a particle size of 100% through 40-mesh, 50% through 60-mesh and 20% through 100-mesh, and a substantial excess of dispersant having a particle size of 95% through 40-mesh, 65% through 100-mesh and 10% through 200-mesh.

2. The jelly-forming composition of claim 1 wherein the pectin employed is methylated pectin.

3. The composition of claim 2 wherein the degree of methylation of the pectin is about 72–75 D.M.

4. A composition according to claim 1 wherein pectin is present at a level of 3–4 parts by weight, fumaric acid is present at a level of 3 parts by weight and the dispersant is present in a substantial excess.

5. The composition of claim 4 wherein the dispersant is a soluble sugar.

6. The composition of claim 4 wherein the dispersant is dextrose.

7. A composition according to claim 1 wherein fumaric acid particles have a particle size approximately equal to the particle size of the pectin particles.

8. A composition according to claim 1 wherein pectin is present at a level of 3–4 parts by weight, dextrose is present at a level of 22–65 parts by weight and fumaric acid is present in amount sufficient to permit attainment of a jelly of pH 2.7–3.6.

9. The composition of claim 8 wherein the fumaric acid is present in amount of 3 parts by weight.

10. An edible fruit jelly prepared from a dry composition comprising 3–4 parts by weight of pectin having a particle size of 100% through 80-mesh and a maximum of 60% through 140-mesh, 22–65 parts by weight of dextrose having a particle size of 95% through 40-mesh, 65% through 100-mesh and 10% through 200-mesh, and sufficient fumaric acid to provide a pH of 2.7–3.6, said fumaric acid having a particle size of 100% through 40-mesh, 50% through 60-mesh and 20% through 100-mesh.

References Cited in the file of this patent

UNITED STATES PATENTS

| | | |
|---|---|---|
| 2,063,143 | Baier | Dec. 8, 1936 |
| 2,076,036 | Leo | Apr. 6, 1937 |
| 2,698,803 | Common et al. | Jan. 4, 1955 |
| 2,918,375 | Gibsen | Dec. 22, 1959 |

FOREIGN PATENTS

| | | |
|---|---|---|
| 359,728 | Great Britain | Oct. 29, 1931 |